Sept. 4, 1962 W. J. GUTKNECHT 3,052,581
METHOD FOR PRODUCING EMBOSSED DESIGNS IN AN INJECTION MOLD
Filed Nov. 28, 1960 2 Sheets-Sheet 1

INVENTOR.
WILLIAM J. GUTKNECHT
BY
*W. B. Hanfman*
ATTORNEY

Sept. 4, 1962   W. J. GUTKNECHT   3,052,581
METHOD FOR PRODUCING EMBOSSED DESIGNS IN AN INJECTION MOLD
Filed Nov. 28, 1960   2 Sheets-Sheet 2

*INVENTOR.*
WILLIAM J. GUTKNECHT
BY
ATTORNEY

United States Patent Office 3,052,581
Patented Sept. 4, 1962

3,052,581
METHOD FOR PRODUCING EMBOSSED DESIGNS
IN AN INJECTION MOLD
William J. Gutknecht, Youngstown, Ohio, assignor to
Roll-Die & Mold Decorators, Inc., Youngstown, Ohio,
a corporation of Ohio
Filed Nov. 28, 1960, Ser. No. 72,045
5 Claims. (Cl. 156—10)

This invention relates to the formation of designs in injection molds such as are used in molding plastic materials wherein the designs are formed in the surface of the plastic article formed in the molds. The invention also relates to the production of plastic articles with embossed surfaces by such molds.

The principal object of the invention is the provision of a process of producing a desired design or the like, in reverse, in the surface of an injection mold which is placed in an injection molding machine and in co-operation with the latter receives plastic material such as polyethylene, to form an article such as a wastebasket.

A further object of the invention is the provision of a process of forming an article of molded plastic material such as polyethylene in which the surfaces of the article are embossed with a desired design.

A still further object of the invention is the provision of a process by which multi-part injection molds may be embossed with designs, figures or letters on the surfaces thereof against which plastic articles are formed in subsequent molding operations so that the designs, figures or letters embossed in the mold appear in the molded article.

A still further object of the invention is the provision of a method of producing embossed designs in an injection mold in which the mold cavity is roughened to insure adhesion of the design forming the materials thereto.

A still further object of the invention is the provision of a method of producing embossed designs in an injection mold in which the finally produced embossed design in the mold cavity is formed with rounded corners so that a plastic article molded therein can be removed therefrom without sticking to the embossed design, or beneath portions thereof.

At the present time many articles used in commerce are molded of suitable plastic materials in injection molding machines which use molds defining desirably shaped cavities into which the plastic materials are injected by the machines and caused to solidify so that a finished article of desirable configuration is produced. Many articles so formed include toys, various items of household equipment and parts of motor vehicles and the like. As an example, a wastebasket formed of polyethylene may be produced economically and efficiently. Wastebaskets heretofore so produced, along with the many other articles, have of necessity had smooth surfaces as determined by the molds in which they are formed.

Heretofore it has been customary to engrave letters and numbers in certain flat portions of a mold and which letters and/or numbers subsequently appeared in the molded article produced therein. It has heretofore been believed impossible to decorate the complete inner surface of an injection mold so that the complete outer surface of an article molded therein would be appropriately decorated. The present method makes possible such a desirable decoration and for example, the polyethylene wastebasket produced in a suitable decorated injection mold has the appearance and feel of a wastebasket formed of leather which makes it a great deal more attractive to the consumer and thereby increases its acceptance in the trade.

The present method provides two additional important steps insuring the successful formation of a desirable design in an injection mold. The first of these steps is the formation of an overall "tooth" or minutely roughened surface in the mold cavity so that the acid resist material applied thereto will securely adhere thereto and will not pull loose or be undercut by the etchant. The second of these two steps comprises a final etch of the injection mold cavity after the desired design has been etched therein and the acid resist material removed therefrom. These final steps round the corners of the etched design and thereby facilitates the ready removable of the articles molded in the mold.

With the foregoing and other objects in view which will appear as the description proceeds, the invention resides in the method hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 16:
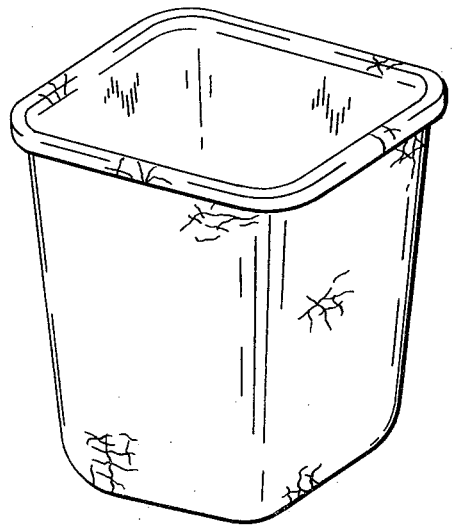
FIGURE 16 is a perspective view of an article molded in the mold and embossed with the design thereof.

By referring to the drawings and FIGURE 16 in particular, it will be seen that an article of commerce such as a wastebasket formed of plastic material, such as polyethylene, is shown and which article has the outer surface thereof embossed in a simulated leather grain so that the wastebasket appears to be formed of leather. In order to produce this simulated leather wastebasket it is necessary that the injection mold in which it is formed be decorated in an overall design conforming exactly with the grain pattern of the leather desired on the finished wastebasket.

Figure 1:
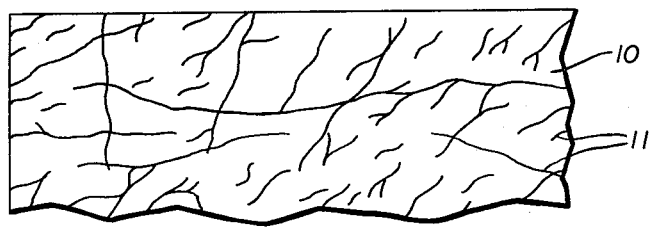
FIGURE 1 is a fragmentary view of a portion of a sheet of paper having an enlarged black and white drawing of a desired design thereon.
Figure 2:
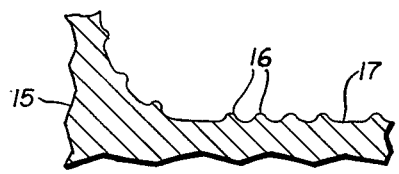
FIGURE 2 is a fragmentary sectional view of a portion of an injection mold having a design formed therein.
Figure 3:
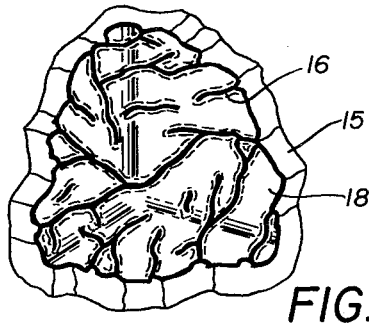
FIGURE 3 is a perspective view of a fragmentary portion of the finished injection mold.
Figure 4:
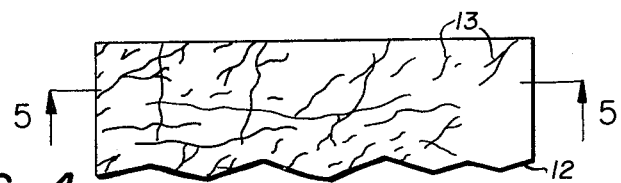
FIGURE 4 is a fragmentary plan view of a portion of a flat metal plate upon which the design, reduced to the exact size desired in the mold, is reproduced by photoengraving.
Figure 5:
FIGURE 5 is a section through the engraving plate taken on line 5—5 of FIGURE 3.
Figure 6:
FIGURE 6 is a section similar to FIGURE 3 showing the engraved plate covered with a waxy bituminous acid resistant substance.
Figure 7:
FIGURE 7 is a similar view showing the manner in which the excess acid resistant substance is removed from the engraved plate so that it remains only in the depressions or low points in the plate.
Figure 8:
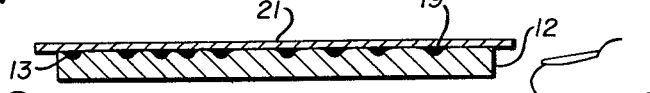
FIGURE 8 is a similar view showing the next step in the process in which a sheet of tissue paper is pressed upon the engraved surface of the plate and stuck tightly to the acid resistant substance.
Figure 9:
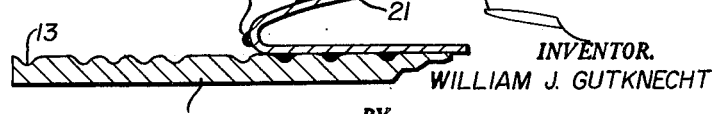
FIGURE 9 is a similar section showing the next step of the process in which the sheet of tissue paper is removed from the engraved plate with the design in the acid resistant substance transferred from the depressions in the plate to the tissue.

By referring now to FIGURE 1 of the drawings, a design on an enlarged scale of such a desirable leather grain may be seen in the form of a black and white drawing which may also be a photographic print of an actual piece of leather. In FIGURE 1, the paper or print is indicated by the numeral 10 and the lines of the leather grain are indicated by the numeral 11. The design is then reproduced, preferably on a reduced scale, by photoengraving, as will be understood by those skilled in the art, on a flat metal plate 12 wherein a plurality of grooves 13 are formed which correspond with the leather grain lines 11 of the design of FIGURE 1. A section of the photoengraved plate 12 is shown in FIGURE 5 and in which the remaining surfaces between the grooves 13 are indicated by the numerals 14. The design reproduced on the flat metal plate 12 must be transferred to the complex curved inner surfaces of a metallic injection mold so that the inner surfaces of the cavity in the mold will carry the design in raised relation thereto. In FIGURE 2 of the drawings a fragmentary sectional view of a portion of a metallic injection mold 15 will be seen with a raised design 16 formed on the complex curved surfaces of the cavity 18 therein as also illustrated in FIGURE 3 of the drawings, wherein a perspective view of a fragmentary portion of the finished injection mold 15 may be seen with the cavity generally indicated by the numeral 18 having the raised design 16 thereon. In order to form the raised design 16 on the complex curved surface of a cavity in a metallic injection mold, the plate 12 heretofore referred to in FIGURE 5 of the drawing is heated and as seen in FIGURE 6, is next covered with a waxy bituminous acid resistant material 19. As shown in FIGURE 7 the excess waxy material 19 is removed from the surface of the plate 12 by a tool 20 leaving the waxy material in the grooves 13. In FIGURE 8 of the drawings the next step in the process is illustrated in which a tissue transfer sheet 21, which may be paper, is pressed firmly against the surface of the plate 12 and against the waxy material 19 in the grooves 13. As shown in FIGURE 9, the tissue 21 is carefully removed from the plate 12 picking up the waxy material 19 thereon in the pattern of the grooves 13 which, it will be remembered, corresponded with the leather grain lines 11 in the original design.

Figure 10:
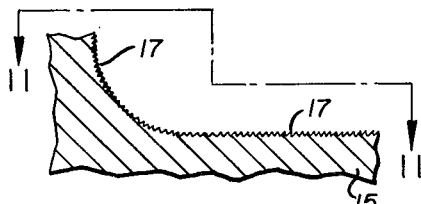
FIGURE 10 is a fragmentary sectional view of a portion of an injection mold showing an overall "tooth" or minutely roughened surface formed therein.
Figure 11:
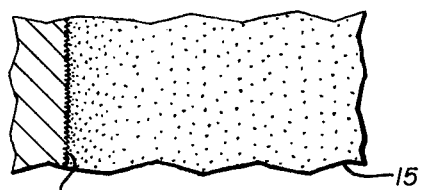
FIGURE 11 is a plan view on line 11—11 of FIGURE 10 showing the "tooth" or minutely roughened surface in the cavity of the injection mold.
Figure 12:
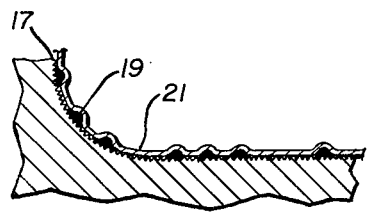
FIGURE 12 is a fragmentary sectional view of a portion of the injection mold of FIGURES 10 and 11 with the tissue paper having an acid resistant substance design thereon placed on the etched interior surfaces of the mold.

By referring to FIGURES 10 and 11 of the drawings, it will be seen that fragmentary and plan views of a section of the mold 15 are shown and that the complex curved surface of the cavity 18 therein has been given a "tooth" or uniformly minutely roughened surface by subjecting said surface to a mild acid bath so as to etch the surface thereof and condition the same for the reception of the waxy material 19 forming the desired design. The tissue 21 with the waxy material 19 in the desired design thereon is then applied to the inner surface of an injection mold, a fragmentary portion of which is shown in FIGURE 12 and indicated by the numeral 15.

Figure 13:
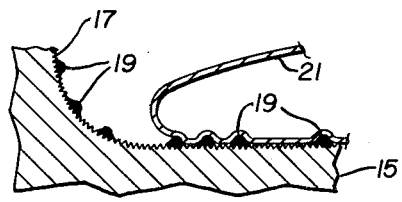
FIGURE 13 is a similar view showing the tissue being removed from the mold leaving the acid resistant substance on the etched surfaces of the mold in the desired design.
Figure 14:
FIGURE 14 is a similar view showing a fragmentary portion of the mold after the same has been etched with a suitable acid.
Figure 15:
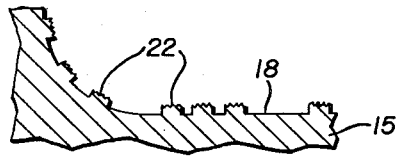
FIGURE 15 is a similar view of the fragment of the mold showing the same with the acid resistant material removed from the etched surface.

The injection mold 15, as will be understood by those skilled in the art, comprises a block of metal in which a cavity is formed and which cavity defines the outer surface of an article to be formed in the mold 15. In FIGURE 12 of the drawings, the tissue transfer sheet 21 with its waxy design 19 is applied to the inner surface of the cavity in the mold 15. A single piece of tissue 21 of a size sufficient to enable it to cover all of the inner surface of the cavity in the mold 15 may be employed or alternately several pieces of tissue 21 made from the same photoengraved plate 12 may be employed with their edge portions carefully butted to insure complete coverage of the inner surface of the cavity in the mold 15. The tissue 21 with its waxy design 19 is positioned in intimate contact with the toothed inner surface 17 of the cavity in the mold 15 and as shown in FIGURES 12 the tissue 21 is then sufficiently moistened with a solution of alcohol and water to cause the tissue to separate from the waxy material 19 after which the tissue is pulled away from the mold leaving the waxy design 19 thereon as seen in FIGURE 13. The mold with the waxy design 19 thereon is then allowed to dry so that the waxy material hardens after which, as shown in FIGURE 14, the mold is subjected to an acid bath such as a nitric acid solution so that all of the portions of the cavity 18 in the mold 15 not covered by the waxy material 19 will be etched by the action of the acid bath. The etching is continued until the desired depth of the embossed design is obtained as seen in FIGURE 14. The mold is then washed to remove the acid and the waxy material 19 is then cleaned from the high spots remaining in the mold with a suitable solvent such as kerosene. The mold 15 as shown in FIGURE 15, thus has the cavity 18 therein with a raised design 22 thereon corresponding to the waxy design 19 and with the original leather grain lines 11 from the drawings or print 10 of FIGURE 1. In a multiple part mold all of the cavity surfaces that will form the outer surface of the article to be molded therein are similarly treated so that the finished mold has a design thereon in raised relation to the surface of the cavity 18, as shown in the fragmentary view comprising FIGURE 3 of the drawings. Those skilled in the art will observe that the raised design 22 in the cavity 18 of the mold 15 as shown in FIGURE 15 has the sharp corners and vertical walls characteristic of an etched design and it will also be apparent that a plastic article formed in said mold 15 will have portions thereof positioned beneath portions of the raised design 22 and therefore be incapable of being removed from the mold without damaging the design formed in the article. The mold as shown in FIGURE 15 is therefore subjected to a final acid bath so that the sharp corners of the raised design 22 are rounded off thereby to protect the raised design as shown in FIGURE 2 of the drawings and heretofore referred to. By referring again thereto, it will be seen that the rounded corners of the raised design 16 readily permit an article formed in the mold 15 to be removed therefrom. Such a mold when positioned in an injection molding machine as known in the art and provided with a plug portion which forms a wall spaced with respect to the cavity 18 in the mold 15 may then receive plastic molding material such as polyethylene which is injected thereinto by the molding machine, as will be understood by those skilled in the art to form an article the outer surface of which will correspond with the size and shape of the cavity 18 and carry the desired design embossed therein and corresponding with the raised design 16 on the surface of the cavity 18 of the mold.

It will thus be seen that the method herein disclosed provides an inexpensive way of forming plastic articles such as the wastebasket of FIGURE 16 with an embossed overall design in its outer surface which closely resembles leather graining so that the wastebasket appears to be formed of beautifully grained leather rather than being molded of a single piece of polyethylene. It will be understood by those skilled in the art that any design capable of being photographically or otherwise reproduced may thus be formed as a raised design on the complex curved inner surface of the cavity of an injection mold so that articles formed therein will have the design embossed therein as an integral part of their outer surface.

This application in a continuation-in-part of my application, Serial No. 813,167, filed May 14, 1959, on Process for Producing Embossed Designs in an Injection Mold, now abandoned.

It will thus be seen that a method for producing embossed designs in an injection mold has been disclosed which meets the several objects of the invention and having thus described my invention, what I claim is:

1. The process of producing an embossed design in the complex curved surface defining the cavity of an injection mold to be used for molding plastic articles which consists in making a reproduction of the design to be made, engraving a reproduction of the design upon a flat metal plate, then filling the depressions in the engraved plate with an acid resistant substance while maintaining said engraved plate at a suitable temperature to facilitate working of said acid resistant substance, then transferring said acid resistant substance from said depressions in said engraved plate to a transfer sheet of tissue paper such that can conform to said complex curved surface of said cavity, then placing said tissue paper on said etched surface of said complex curved surface so that the tissue paper along with the acid resistant substance thereon conforms exactly to the configuration of such surface within said injection mold to be embossed and causing said acid resistant substance to adhere to said etched inner surface of said cavity of said mold, then wetting said tissue paper with an aqueous alcohol solution, then removing said tissue paper leaving said acid resistant substance upon said etched inner surface of said cavity in said mold and then etching the uncovered portions of said inner surface of said cavity in said mold with acid so as to produce the design upon said inner surface of said cavity in said mold in reverse to the design upon said flat engraved plate, then removing said acid resistant substance from said inner surface of said cavity in said mold and then etching said inner surface of said cavity in said mold with acid sufficiently to round off the sharp corners of said design produced thereon.

2. The process of producing an embossed design in the complex curved surface defining the cavity of an injection mold to be used for molding plastic articles which consists in etching the complex curved surface defining the cavity in said injection mold with acid to roughen said surface, then making a reproduction of the design to be made, engraving said reproduction of the design upon a flat metal plate, then filling the depressions in the engraved plate with an acid resistant substance while maintaining said engraved plate at a suitable temperature to facilitate working of said acid resistant substance, then transferring said acid resistant substance from said depressions in said engraved plate to a transfer sheet of tissue paper such that can conform to said complex curved surface of said cavity, then placing said transfer sheet on said etched surface of said complex curved surface so that the transfer sheet along with the acid resistant substance thereon conforms exactly to the configuration of such surface within said injection mold to be embossed and causing said acid resistant substance to adhere to said etched surface of said cavity of said mold, then wetting said transfer sheet wtih a wetting agent and stripping said transfer sheet from said cavity, leaving said acid resistant substance upon said etched inner surface of said cavity in said mold and then etching the uncovered portions of said inner surface of said cavity in said mold with acid so as to produce the design in relief upon said inner surface of said cavity in said mold in reverse to the design upon said flat engraved plate, then removing said acid resistant substance from said inner surface of said cavity in said mold and then etching said inner surface of said cavity in said mold with acid sufficiently to round off the sharp corners of said design produced thereon.

3. The process of producing an embossed design in the complex curved surface defining the cavity of an injection mold to be used for molding plastic articles which consists in etching the complex curved surface defining the cavity in said injection mold with acid to roughen said surface, then executing an enlarged drawing of the design to be made, engraving a reduced reproduction of the design upon a flat metal plate, then filling the depressions in the engraved plate with an acid resistant substance while maintaining said engraved plate at a suitable temperature to facilitate working of said acid resistant substance, then transferring said acid resistant substance from said depressions in said engraved plate to a sheet of flexible tissue paper, then placing said flexible tissue paper on said etched surface of said complex curved surface such that the flexible tissue paper along with the acid resistant substance thereon conforms exactly to the configuration of such surface within said injection mold to be embossed and causing said acid resistant substance to adhere to said etched surface of said cavity of said mold, then wetting said flexible tissue paper with an aqueous alcohol solution, then removing said flexible tissue paper leaving said acid resistant substance upon said etched inner surface of said cavity in said mold and then etching the uncovered portions of said inner surface of said cavity in said mold with acid so as to produce the design upon said inner surface of said cavity in said mold in reverse to the design upon said flat engraved plate, then removing said acid resistant substance from said inner surface of said cavity in said mold and then etching said inner surface of said cavity in said mold with acid sufficiently to round off the sharp corners of said design produced thereon.

4. The process for producing a raised embossed design in the complex curved surface defining the cavity of a hard metal injection mold to be used for molding plastic articles which consists in etching the complex curved surface defining the cavity in said injection mold with acid to roughen said surface, then producing a black and white print of the design to be made, photoengraving a reproduction of said design upon a flat metal plate to the exact size of the area of the cavity in said mold, then covering said engraved plate surface with a layer of waxy bituminous acid resistant substance while maintaining said engraved plate at suitable temperature to facilitate working of said acid resisting substance, then removing the excess acid resistant substance from the engraved plate surface so that only the depressions in the engraved plate below the original surface thereof remain filled with the said acid resistant substance, then laying a sheet of thin flexible transfer sheet such that can conform to said complex curved surface defining said cavity upon the engraved plate surface and pressing the thin flexible transfer sheet against the engraved plate surface so as to cause the paper to adhere tightly to the acid resistant substance, in the depressions in the engraved plate, then removing said thin flexible transfer sheet from the engraved plate with the acid resistant substance adhering thereto, then pressing the thin flexible transfer sheet against the etched surface of said complex curved surface such that the thin flexible transfer sheet along with the acid resistant substance thereon conforms exactly to the configuration of such surface within said injection mold to be embossed to cause said acid resistant substance to adhere to the etched surface of said cavity, then moistening the other side of the thin flexible transfer sheet with an aqueous solution of alcohol and then removing the thin flexible transfer sheet from the etched surface of the cavity in said mold and then etching the uncovered portions of the surface of the cavity in the mold with acid so as to produce the design in relief upon the surface of the cavity in the mold in reverse to the design upon the flat engraved plate, then removing said acid resistant substance from said inner surface of said cavity in said mold and then etching said inner surface of said cavity in said mold with acid sufficiently to round off the sharp corners of said design produced thereon.

5. The process for producing a raised embossed design in the complex curved surface of a metallic injection mold to be used for molding plastic articles which consists in etching the complex curved surface defining the cavity in said injection mold with acid to roughen said surface, then producing a black and white print of the design to be made, photoengraving a reproduction of said design upon a flat metal plate to the exact size of the area of the cavity in said mold, then covering said engraved plate surface with a layer of waxy bituminous acid resistant substance while maintaining said engraved plate at suitable temperature to facilitate working of said acid resisting substance, then removing the excess acid resistant substance from the engraved plate surface so that only the depressions in the engraved plate below the original surface thereof remain filled with the said acid resistant substance, then laying a first sheet of thin flexible tissue paper such that can conform to said complex curved surface of said cavity upon the engraved plate surface and pressing the thin flexible tissue paper against the engraved plate surface so as to cause the thin flexible tissue paper to adhere tightly to the acid resistant substance in the depressions in the engraved plate, then removing said thin flexible tissue paper from the engraved plate with the acid resistant substance adhering thereto, then refilling said depressions in said engraved plate with acid resistant substance, then laying a second sheet of thin flexible tissue paper such that can conform to said complex curved surface of said cavity upon the engraved plate surface and pressing the second sheet against the engraved plate surface so as to cause the second sheet to adhere tightly to the acid resistant substance in the depressions in the engraved plate, then removing said second sheet from the engraved plate with the acid resistant substance adhering thereto, then placing said first sheet on one portion of said complex curved etched surface such that the first sheet along with the acid resistant substance thereon conforms exactly to the configuration of said portion of said surface so as to cause the acid resistant substance on said first sheet to adhere to said etched surface, then placing the said second sheet on said etched complex curved surface and carefully butting the edge portions of the sheet to one another to insure complete coverage of said surface such that the second sheet along with the acid resistant substance thereon conforms exactly to the configuration of said surface so as to cause the acid resistant substance on said second sheet to adhere to said etched surface, then moistening the other sides of said sheets with an aqueous solution of alcohol and removing said sheets from said surface, and then etching the uncovered portions of the surface of the cavity in the mold with acid so as to produce the total design in relief upon the surface of the cavity in the mold in reverse to the design upon the flat engraved plate, then removing said acid resistant substance from said inner surface of said cavity in said mold and then etching said inner surface of said cavity in said mold with acid sufficiently to round off the sharp corners of said design produced thereon.

References Cited in the file of this patent

UNITED STATES PATENTS

| | | |
|---|---|---|
| 2,149,732 | Groff | Mar. 7, 1939 |
| 2,621,114 | Johnson | Dec. 9, 1952 |
| 2,684,291 | Wilson et al. | July 20, 1954 |